(12) United States Patent
Notsch

(10) Patent No.: US 10,263,516 B1
(45) Date of Patent: Apr. 16, 2019

(54) CASCADED VOLTAGE CONVERTER WITH INTER-STAGE MAGNETIC POWER COUPLING

(71) Applicant: Infineon Technologies Austria AG, Villach (AT)

(72) Inventor: Chris Josef Notsch, Villach (AT)

(73) Assignee: Infineon Technologies Austria AG, Villach (AT)

(*) Notice: Subject to any disclaimer, the term of this patent is extended or adjusted under 35 U.S.C. 154(b) by 0 days.

(21) Appl. No.: 15/913,000

(22) Filed: Mar. 6, 2018

(51) Int. Cl.
- *H02M 3/156* (2006.01)
- *G05F 1/32* (2006.01)
- *H02M 1/00* (2006.01)

(52) U.S. Cl.
CPC ............. *H02M 3/156* (2013.01); *G05F 1/32* (2013.01); *H02M 2001/0003* (2013.01); *H02M 2001/0064* (2013.01)

(58) Field of Classification Search
CPC ............ H02M 3/07; H02M 2001/007; H02M 2003/072; H02M 2001/009; H02M 2001/0083; H02M 2001/0003; H02M 2001/0064; H03K 2217/0063; H03K 2217/0072

See application file for complete search history.

(56) References Cited

U.S. PATENT DOCUMENTS

| | | | | |
|---|---|---|---|---|
| 6,574,125 B2* | 6/2003 | Matsukawa | ....... | H02M 3/33569 363/132 |
| 9,780,670 B2* | 10/2017 | Trevisan | ........... | H02M 3/33507 |
| 9,825,545 B2* | 11/2017 | Chen | ................. | H02M 3/33546 |
| 9,973,099 B2* | 5/2018 | Ye | ..................... | H02M 3/33576 |
| 2013/0016543 A1* | 1/2013 | Ku | ................... | H02M 7/53871 363/71 |
| 2014/0254224 A1* | 9/2014 | Feldtkeller | .......... | H02M 7/5387 363/127 |
| 2014/0268903 A1* | 9/2014 | Reiter | ................ | H02M 3/3376 363/21.02 |

(Continued)

OTHER PUBLICATIONS

Notsch, Chris, "Switched-Capacitor Converter with Interleaved Half Bridges", U.S. Appl. No. 15/913,363, filed Mar. 6, 2018.

(Continued)

*Primary Examiner* — Yusef A Ahmed
(74) *Attorney, Agent, or Firm* — Murphy, Bilak & Homiller, PLLC

(57) ABSTRACT

Circuits and methods are provided for using a switching voltage converter to convert an input voltage into an output voltage. The voltage converter includes multiple switch stages, and the switch stages are coupled to each other both galvanically and magnetically. Power is transferred among the switch stages magnetically via magnetic coupling elements (e.g., transformer windings) that are coupled to each of the switch stages. The magnetic power transfer allows the voltage converter to support high power transfers, while the galvanic connections between the switch stages allows for relatively simple control of switches within the switch stages. Inductances associated with the magnetic coupling elements, may provide zero-voltage switching (ZVS) of the switches. Due to the simple switch control, magnetic power transfer, and ZVS, the provided voltage converters support relatively high power transfers in an efficient manner.

21 Claims, 8 Drawing Sheets

(56) References Cited

U.S. PATENT DOCUMENTS

| | | | | |
|---|---|---|---|---|
| 2015/0029761 A1* | 1/2015 | Trinh | ............... | H02M 1/36 |
| | | | | 363/17 |
| 2015/0131329 A1* | 5/2015 | Chen | ............... | H02M 1/08 |
| | | | | 363/17 |
| 2015/0162841 A1* | 6/2015 | Masuda | ........... | H02M 3/33584 |
| | | | | 363/17 |
| 2015/0180345 A1* | 6/2015 | Frost | ............. | H02M 3/3376 |
| | | | | 363/17 |
| 2015/0222193 A1* | 8/2015 | Zambetti | .......... | H02M 3/33546 |
| | | | | 363/21.02 |
| 2015/0295497 A1* | 10/2015 | Perreault | ............ | H02M 3/3376 |
| | | | | 363/21.03 |
| 2015/0349649 A1* | 12/2015 | Zane | ............... | H02M 3/33507 |
| | | | | 363/21.03 |
| 2016/0043624 A1* | 2/2016 | Jarvinen | .............. | H02M 1/084 |
| | | | | 323/271 |
| 2016/0072393 A1* | 3/2016 | McIntyre | .............. | G01R 19/00 |
| | | | | 363/21.1 |
| 2016/0190943 A1* | 6/2016 | Chen | .................. | H02M 3/335 |
| | | | | 363/21.06 |
| 2016/0336873 A1* | 11/2016 | Ayai | ................ | H02M 3/33576 |
| 2017/0085176 A1* | 3/2017 | Mathe | ............... | H02M 3/1584 |
| 2017/0085183 A1* | 3/2017 | Notsch | ............ | H02M 3/33507 |
| 2017/0085189 A1* | 3/2017 | Madsen | ........... | H02M 3/33546 |
| 2017/0288555 A1* | 10/2017 | Trevisan | ........... | H02M 3/33523 |
| 2018/0062522 A1* | 3/2018 | Popovici | .......... | H02M 3/33569 |
| 2018/0115250 A1* | 4/2018 | Ng | ................. | H02M 3/33546 |

OTHER PUBLICATIONS

Rainer, Christian, "Switched Capacitor Converter with Compensation Inductor", U.S. Appl. No. 15/848,782, filed Dec. 20, 2017.

* cited by examiner

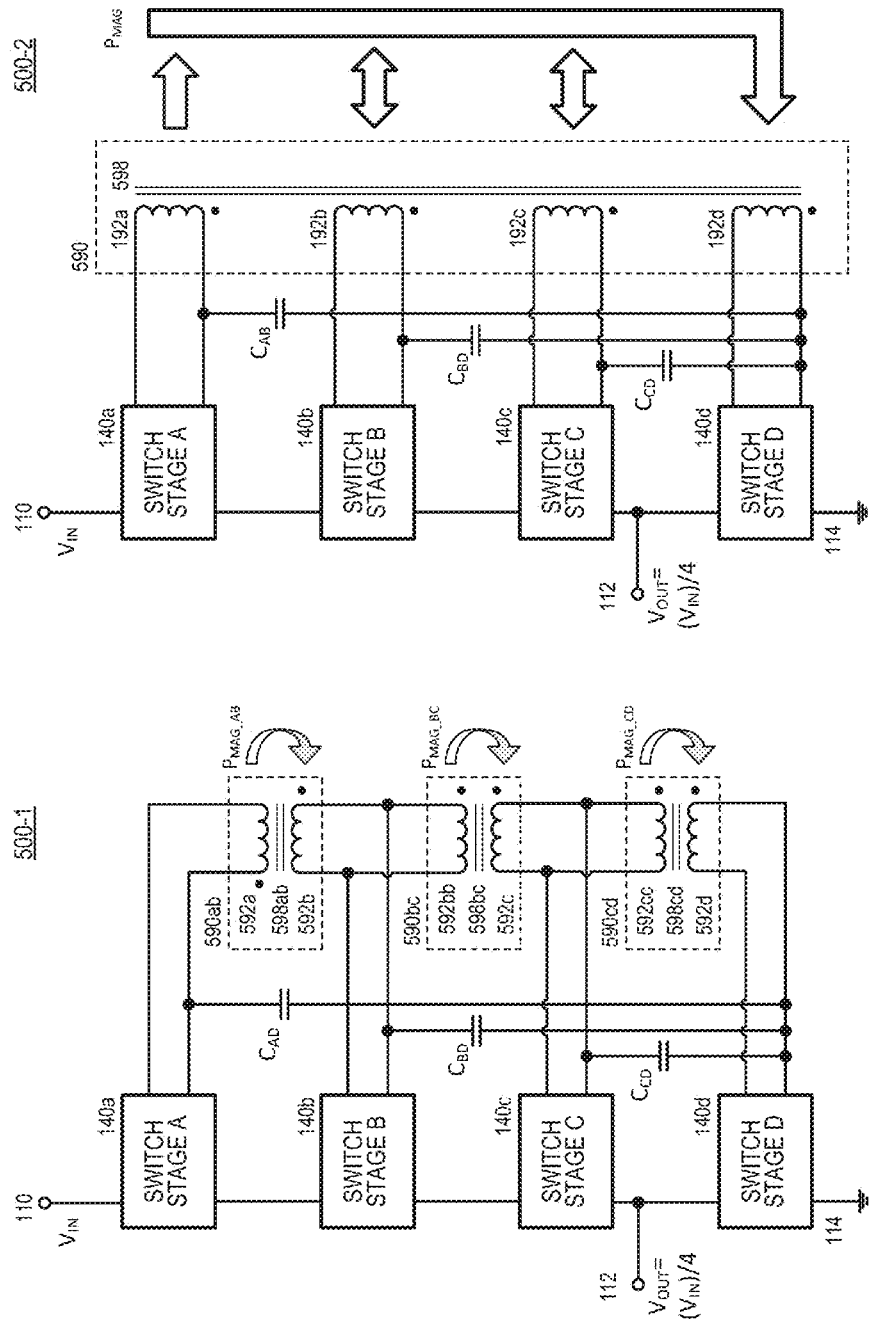

CASCADED VOLTAGE CONVERTER WITH INTER-STAGE MAGNETIC POWER COUPLING

TECHNICAL FIELD

The present application relates to a voltage converter which includes multiple switch stages electrically cascaded together, and wherein power is magnetically transferred among the switch stages using magnetic coupling elements.

BACKGROUND

Switching direct current (DC) to DC voltage converters are used in a variety of applications for converting power at an input voltage into power at a desired output voltage. Such voltage converters are used to power battery chargers, computers, televisions, and many other electronic devices. Switching voltage converters may be broadly classified into isolated and non-isolated topologies, and into regulated and non-regulated categories.

Isolated voltage converters use magnetic coupling, via, typically, a transformer, to transfer power from a primary to a secondary side. One or more switches (e.g., transistors) are used to generate voltage pulses from an input DC voltage source. The resultant alternating current (AC) voltage is supplied to the primary side of the transformer, thereby inducing an AC voltage on the secondary side of the transformer, which may be rectified to provide DC power to a load. The transformer provides galvanic (electrical) isolation between the primary and secondary sides, which has safety advantages particularly for high-power applications.

Non-isolated switching voltage converters may also use magnetics, as provided by inductors, to convert an input voltage into an output voltage, but do not provide galvanic isolation between the input and output. Example non-isolated voltage converters include buck, boost, and buck-boost converters.

Most switching voltage converters are regulated so as to provide a near-constant voltage or current at their outputs. This is accomplished by adapting the conduction timing of the switches that control the power flow through the voltage converter based, at least in part, upon a measured voltage or current at the output of the voltage converter. For example, a measured output voltage falling below a desired reference output voltage might force a change in the switching frequency and or duty cycle of signals that control the switches, such that additional power is transferred from the input to the output of the voltage converter. The switch control signals are typically generated by a controller that implements a closed-loop control technique, so as to regulate the output voltage at a near constant level.

Some electric loads do not require tight regulation, and the voltage converters used to supply such loads may forgo complex closed-loop control techniques and the associated measurement sensors required by closed-loop control. Switched capacitor converters (SCCs) represent one class of voltage converters that may be operated in an unregulated mode. SCCs are commonly used to step down an input voltage by a fixed ratio, e.g., 2:1, 4:1. Such step-down SCCs effectively function as voltage dividers. In an alternate configuration, an SCC may operate in a step-up mode, wherein an input voltage is multiplied by a fixed ratio, e.g., providing a step-up of 2, 4. SCCs provide low-impedance, high-efficiency voltage conversion for applications where regulation is not required.

SCC operation depends upon using switches to transfer energy among several capacitors. Within an SCC circuit, there is a trade-off between switch frequency and capacitor size. To use reasonably small capacitors, the switch frequencies must be relatively high. High switching frequencies typically require switches that have relatively low current flow capabilities. Hence, usage of SCCs is often limited to applications wherein the SCC load requires relatively low or moderate current (power).

A switching voltage converter that exhibits the relative simplicity and efficiency of an SCC, but that is able to transfer high current levels, is desired.

SUMMARY

According to an embodiment of a voltage converter, the voltage converter comprises at least two switch stages and associated magnetic coupling elements, a controller, an input, and an output. The switch stages are electrically coupled together in a cascade arrangement. Each switch stage includes at least a first switch that comprises first, second, and control terminals. In preferred embodiments, each switch stage further includes a second switch. Each switch stage has an associated magnetic coupling element that magnetically couples that switch stage to one or more other switch stages of the voltage converter. The controller is operable to control switching of the first switch of each of the switch stages. This is accomplished by providing control signals to the control terminals of the first switches such that, for a given switch stage, power is transferred magnetically between the given switch stage and at least one other switch stage via the magnetic coupling element associated with the given switch stage. The input is provided for coupling the voltage converter to an input power supply, and is electrically coupled to at least one of the switch stages. The output is provided for supplying power to a load of the voltage converter, and is electrically connected to at least one of the switch stages. The input and output are electrically connected to each other via at least one of the switch stages.

According to an embodiment of an electrical system, the electrical system comprises a voltage converter as described above. The electrical system further comprises a load that is electrically coupled to the voltage converter output, and that is supplied power by the voltage converter.

According to a method for voltage conversion, power is magnetically transferred among switch stages within a voltage converter such as that described above. The method comprises turning on first switches within each of the switch stages for a first conducting interval. Power is magnetically transferred during this first conducting interval, via the magnetic coupling elements, between at least two of the switch stages. The first switches are then turned off for a dead-time interval, during which the magnetic coupling elements demagnetize. In preferred embodiments, the voltage converter further comprises a second switch. For such embodiments, the steps described above are repeated for the second switches within each of the switch stages, by turning on the second switches for a second conducting interval; and turning off the second switches for a dead-time interval. The sequence of turning on the first switch for a first conducting interval, keeping the switches off for a dead time, turning on the second switch for a second conducting interval, and keeping the switches off for a dead time is repeated indefinitely while the voltage converter is operational.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments may be combined unless they exclude each other. Embodiments are depicted in the drawings and are detailed in the description that follows.

FIGS. 5A and 5B illustrate different magnetic coupling linkages for a voltage converter.

DETAILED DESCRIPTION

Figure 1:
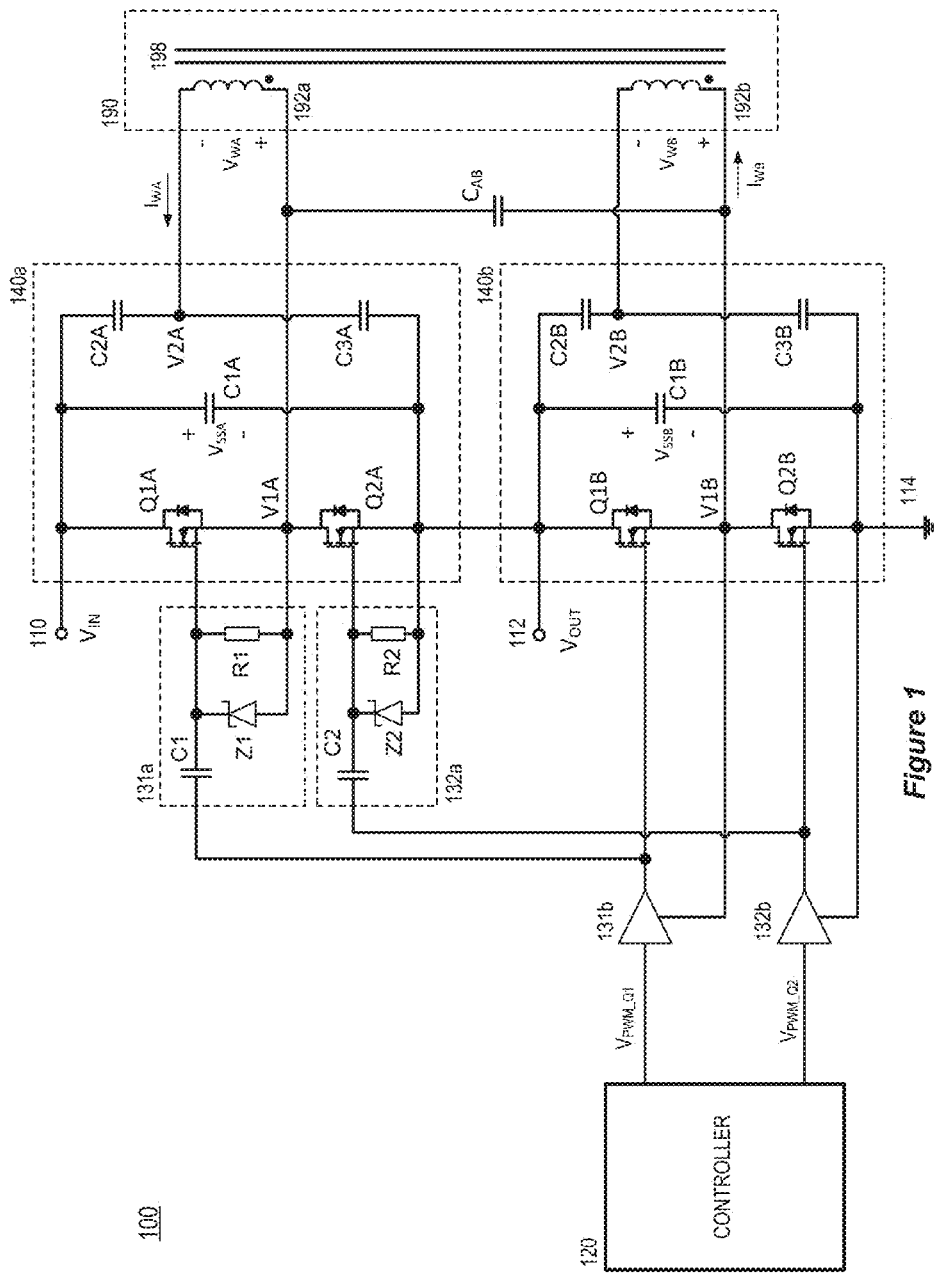
FIG. 1 illustrates a schematic diagram of a voltage converter having two half-bridge switch stages, and in which power is transferred between the switch stages both magnetically and galvanically.

The embodiments described herein provide circuits and methods for stepping an input voltage up or down according to a fixed conversion ratio. The circuit topologies employed enable high power transfer (current flow) between an input and an output, without using excessively large capacitors as would be required by a conventional switched-capacitor converter (SCC) supporting high power transfer. The described circuits may use relatively simple switch control techniques, as are typically used within SCCs. This is accomplished by employing a cascaded arrangement of switch stages that are electrically (galvanically) coupled together. Unlike within an SCC wherein the power transfer between switch stages relies solely upon the electrical connection, however, the circuits described herein transfer substantial power between the switch stages using electromagnetic coupling, e.g., via windings within a transformer. In preferred embodiments, a magnetizing inductance of a transformer is used to achieve zero-voltage switching (ZVS) of the switches within the switch stages. The ZVS leads to low power losses due to switch transitions, and a highly efficient voltage converter.

Step-down SCCs use power switches to transfer energy among linking capacitors within an SCC to convert an input voltage into a stepped-down output voltage. For example, a 4:1 SCC may employ four switch stages to convert an input voltage of 48V into an output voltage of 12V. Each of the linking capacitors within an SCC is alternately charged and discharged by the power switches, and each such capacitor must be capable of storing the amount of charge (energy) provided to that capacitor during a switch cycle of the SCC. In a typical SCC, the capacitors may be sized to have capacitances in the 4.7 to 47 µF range and the switches are switched at a frequency of 100 KHz to 1 MHz. SCCs are typically limited to relatively low or moderate power applications, due to the implementation limitations imposed by switching speed and capacitor size. For example, power switches, such as metal-oxide semiconductor field-effect transistors (MOSFETs), that support the high switching frequencies required by SCCs are not able to support high current flows, thereby making the usage of SCCs for high-power applications largely unfeasible.

Rather than relying exclusively upon high-frequency switches and capacitors for galvanically transferring energy between switch stages, the circuit topologies described herein additionally transfer energy between switch stages using magnetic coupling. This allows for very high power transfers. The switching frequency employed may be much lower than that required by typical SCCs, meaning that high-power (low-frequency) power switches may be used. Unlike voltage converters based upon isolated topologies, the voltage converters described herein comprise switch stages that are also galvanically (electrically) coupled to each other in a cascade arrangement. Also unlike typical isolated-topology voltage converters, the cascade arrangement of switch stages allows for a relatively simple switch control technique. Furthermore, for preferred embodiments, the magnetic coupling element (e.g., a transformer winding) that provides the magnetic energy transfer also leads to ZVS of the power switches.

The inventions are described below by way of particular examples. These examples have the common features that they include multiple switch stages, and at least some of these switch stages are galvanically (electrically) connected in a cascade (series) arrangement. The examples also exhibit a common feature in that at least some of the switch stages are magnetically coupled to each other, such that power is transferred among the stages magnetically. It should be understood that the below examples are not meant to be limiting. Circuits and techniques that are well-known in the art are not described in detail, so as to avoid obscuring the unique aspects of the invention. Features and aspects from the example embodiments may be combined or re-arranged, except where the context does not allow this.

The description begins with an embodiment of a voltage converter having two half-bridge switch stages, wherein the voltage converter is operated to step down a voltage. It is then explained that the described voltage converter topologies may additionally be employed to step up (boost) an input voltage. This is followed by embodiments in which the voltage converter circuitry is extended to have different numbers of switch stages. Embodiments employing different magnetic coupling linkages among the switch stages are next described. In a further example, the voltage converter is modified to employ full-bridge switch stages. Yet another embodiment shows how fractional step-down or step-up voltage ratios may be achieved. Finally, a method is described for converting voltage levels by transferring power among switch stages both galvanically and magnetically.

Voltage Converter with Cascaded and Magnetically-Coupled Half-Bridge Switch Stages FIG. 1 illustrates an embodiment of a voltage converter 100 having two switch stages 140a, 140b. The switch stages 140a, 140b are each arranged using a half-bridge topology, and each has an associated magnetic coupling element 192a, 192b for transferring power between the switch stages 140a, 140b. A controller 120 provides switch control signals $V_{PWM\_Q1}$, $V_{PWM\_Q2}$, via switch drivers 131a, 132a, 131b, 132b, to switches Q1A, Q2A, Q1B, Q2B within the switch stages 140a, 140b. First, second, and ground terminals 110, 112, 114 provide external electrical contact points for the voltage converter 100. The description below focuses on a 2:1 step-down configuration for the voltage converter 100, in which the first terminal 110 is supplied with a relatively high voltage $V_{IN}$ that is stepped down by a factor of two to provide a lower voltage $V_{OUT}$ at the second terminal 112. In such a configuration, the first terminal 110 serves as an input for connecting to a power source, and the second terminal 112 serves as an output for supplying power to a load (not shown) of the voltage converter 100. As will be explained further below, the voltage converter 100 may alternatively be operated in a step-up mode, in which the second terminal 112 serves as an input and the first terminal 110 serves an output.

The controller 120 generates a first pulse-width-modulated (PWM) signal $V_{PWM\_Q1}$, which controls the first switches Q1A, Q1B of each switch stage, and generates a second PWM signal $V_{PWM\_Q2}$, which controls the second switches Q2A, Q2B of each switch stage. While the voltage converter 100 of FIG. 1 includes only two switch stages 140a, 140b, other embodiments may have more switch stages, in which case the first and second PWM signals $V_{PWM\_Q1}$, $V_{PWM\_Q2}$ may also control first and second switches within such other switch stages. The generated PWM signals $V_{PWM\_Q1}$, $V_{PWM\_Q2}$ have alternating active pulses such that, e.g., the first switch Q1A is set to conduct while the second switch Q2A is off during a first interval, followed by a second interval during which the second switch Q2A is set to conduct while the first switch Q1A is turned off. The PWM signals $V_{PWM\_Q1}$, $V_{PWM\_Q2}$ are generated such that the first and second switches Q1A, Q2A are not turned on (conducting) at the same time. The first and second conduction intervals are separated by "dead time" intervals during which neither of the first and second switches Q1A, Q2A conducts. The generated PWM signals $V_{PWM\_Q1}$, $V_{PWM\_Q2}$ similarly control the switches Q1B, Q2B of the second switch stage 140b.

The controller 120 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controller 120 may also include memory, e.g., non-volatile memory such as flash, that includes instructions or data for use by the processor circuitry, and one or more timers, e.g., for generating the first and second conduction intervals according to a switching frequency; and dead time intervals. Because the voltage converter 100 operates using a fixed down or up conversion ratio, the controller 120 may be less complex than controllers that require adaptive, closed-loop control based upon the sensing of feedback signals; as is typical of most isolated voltage converter topologies and many non-isolated voltage converter topologies.

The PWM signals $V_{PWM\_Q1}$, $V_{PWM\_Q2}$ generated by the controller 120 are fed to driver circuits 131a, 132a, 131b, 132b which, in turn, output PWM control signals having appropriate voltage levels to drive control terminals (e.g., gates) of each of the switches Q1A, Q2A, Q1B, Q2B. As illustrated, the driver circuits 131b, 132b provide output control signals referenced, respectively, to source voltages of the switches Q1B, Q2B within the second switch stage 140b. For example, the gate-to-source voltage provided to each of the switches Q1B, Q2B may alternate between 0V and 5V. The driver circuits 131a, 132a provide signals to control the switches Q1A, Q2A of the first switch stage 140a. So as to limit the number of active driver circuits, the illustrated embodiment uses bootstrap switch drivers 131a, 132a for the first switch stage 140a. The bootstrap switch drivers 131a, 132a use linking capacitors C1, C2 to couple, respectively, the signals output from the driver circuits 131b, 132b to control terminals (e.g., gates) of the respective switches Q1A, Q2A of the first switch stage. The illustrated bootstrap switch drivers 131a, 132a also include Schottky diodes Z1, Z2, and resistors R1, R2, which serve to clamp and equalize the voltage at the control terminals of the switches Q1A, Q2A, so that the control terminal voltages remain within a desired range. Note that other driver circuits, e.g., conventional (active) level-shifting drivers, may be used in place of the bootstrap switch drivers 131a, 132a.

The illustrated switch stages 140a, 140b are each configured using a half-bridge topology that includes two power switches. Taking the first switch stage 140a as representative, a capacitor C1A smooths a voltage $V_{SSA}$ across the entire switch stage 140a. Capacitors C2A, C3A are serially connected, coupled across the switch stage 140a, and have equal capacitances, such that a DC voltage at their connection node V2A is maintained at one-half of the DC voltage $V_{SSA}$ across the entire first switch stage 140a, relative to a reference voltage (e.g., $V_{OUT}$) for the first switch stage 140a. For example, if a voltage $$V_{OUT} = \frac{V_{IN}}{2}$$

is maintained at the second terminal 112 of the voltage converter 100, then a voltage of $$\frac{3V_{IN}}{4}$$

should be maintained at the connection node V2A. The first and second switches Q1A, Q2A each have first, second, and control terminals (e.g., drain, source, and gate). The first terminal of the first switch Q1A is coupled to the first terminal 110 of the voltage converter 100. The second terminal of the first switch Q1A is coupled to the first terminal of the second switch Q2A at a first switching node V1A. The second terminal of the second switch Q2A serves as a terminal of the first switch stage 140a and, for the illustrated two-stage voltage converter 100, is coupled to the second terminal 112 of the voltage converter 100.

The second switch stage 140b is configured and includes components substantially the same as the first switch stage 140a, except that the second switch stage 140b has external connections 112, 114 different from those of the first switch stage 140a.

The switches Q1A, Q2A, Q1B, Q2B within the illustrated voltage converter 100 of FIG. 1 are power metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The switches Q1A, Q2A, Q1B, Q2B may be integrated on the same semiconductor die, may each be provided on separate dies, or may otherwise be spread across a plurality of semiconductor dies. Each of the MOSFET switches Q1A, Q2A, Q1B, Q2B within the voltage converter 100 has drain and source terminals, as well as a gate terminal that controls conduction between the drain and source. As compared with the switches used within SCCs, which must support relatively high frequencies so as to allow reasonably-sized link capacitors, the switches Q1A, Q2A, Q1B, Q2B of the voltage converter 100 do not necessarily need to support high-switching frequencies. This, in turn, allows the use of higher-power switches than might be viable within SCCs which, further, allows the voltage converter 100 to support higher power throughput than is possible in other power converter topologies, e.g., SCCs.

A link capacitor $C_{AB}$ couples the switching node V1A of the first switch stage 140a to the switching node V1B of the second switch stage 140b. While the link capacitor $C_{AB}$ is capable of storing and releasing energy as in a conventional SCC, the energy transfer between the first and second switch stages is largely accomplished using magnetic coupling. Hence, the link capacitor $C_{AB}$ may have a relatively small capacitance (and associated size), at least as compared with link capacitors required by SCCs. While the link capacitor $C_{AB}$ is included in the illustrated voltage converter 100 of FIG. 1, it may be omitted in other embodiments.

As illustrated, the magnetic coupling elements 192a, 192b are windings that are included within a transformer 190. The first winding 192a is connected across the switching node V1A and the capacitor connection node V2A within the first switch stage 140a, whereas the second winding 192b is connected across like nodes within the second switch stage 140b. The transformer 190 further includes a core 198, which electromagnetically couples the windings 192a, 192b. The core 198 may be a ferrite core, an air core, or comprised of any other material provided that the coupling elements 192a, 192b are magnetically coupled to each other. Voltages $V_{WA}$, $V_{WB}$ across, and currents $I_{WA}$, $I_{WB}$ through the magnetic coupling elements 192a, 192b are denoted to aid in the voltage and current waveform descriptions that follow.

Voltage and Current Waveforms within the Two-Stage Step-Down Voltage Converter

Figure 2:
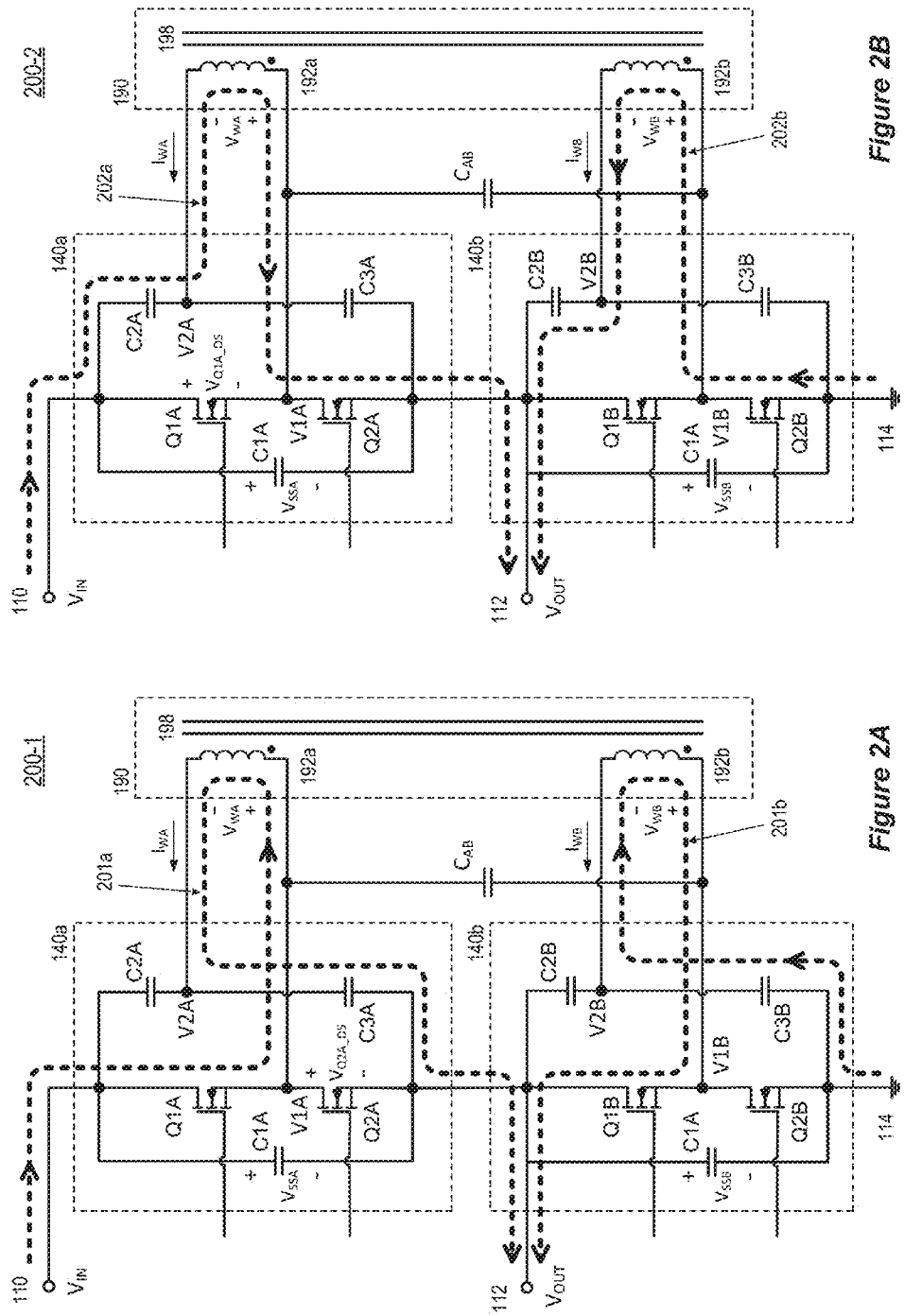
FIGS. 2A and 2B illustrate power loops within switch stages of a voltage converter such as that shown in FIG. 1 for; respectively, first and second conduction intervals.

The operation of the voltage converter 100 will now be described using the power loops shown in FIGS. 2A and 2B, and associated voltage and current waveforms shown in FIG. 3. FIGS. 2A and 2B illustrate circuits 200-1, 200-2 corresponding to the voltage converter 100 of FIG. 1. For ease of illustration, several components of the voltage converter 100, e.g., the controller, drivers, body diodes, are omitted in FIGS. 2A and 2B.

FIG. 2A illustrates power loops 201a, 201b for the first (conducting) interval. As described previously, the controller 120 sets the first switches Q1A, Q1B of the switch stages 140a, 140b to conduct during this first interval. The power loop 201a shows current flow within the first switch stage 140a. More particularly, current flows from the first terminal 110, through the first switch Q1A, through the first winding 192a, through the capacitor C3A; and to the second terminal 112. For the illustrated step-down operational mode, the first terminal 110 serves as an input, and the second terminal 112 serves as an output, such that positive current flows from the input to the output through the first switch stage 140a.

During the first interval, current also flows in the power loop 201b within the second switch stage 140b. More particularly, current flows from the ground 114, through the capacitor C3B, through the second winding 192b, through the first switch Q1B, and to the second terminal 112. Positive current flows through the second switch stage 140b in the direction from the ground 114 to the output.

FIG. 2B illustrates power loops 202a, 202b for the second (conducting) interval. During the second interval, the controller 120 holds the first switches Q1A, Q1B in their off (nonconducting) state, and sets the second switches Q2A, Q2B to conduct. For the first switch stage 140a, this leads to the illustrated current flow of power loop 202a, i.e., current flows from the first terminal 110, through the capacitor C2A, through the first winding 192a, through the second switch Q2A, and to the second terminal 112. As in the first interval, positive current flows in the direction from the first terminal 110, which is serving as an input, to the second terminal 112, which is serving as an output.

During the second interval, current also flows in the power loop 202b within the second switch stage 140b. As during the first interval, positive current flows through the second switch stage 140b from the ground 114 to the second terminal 112; albeit through the different path 202b, as illustrated.

Figure 3:
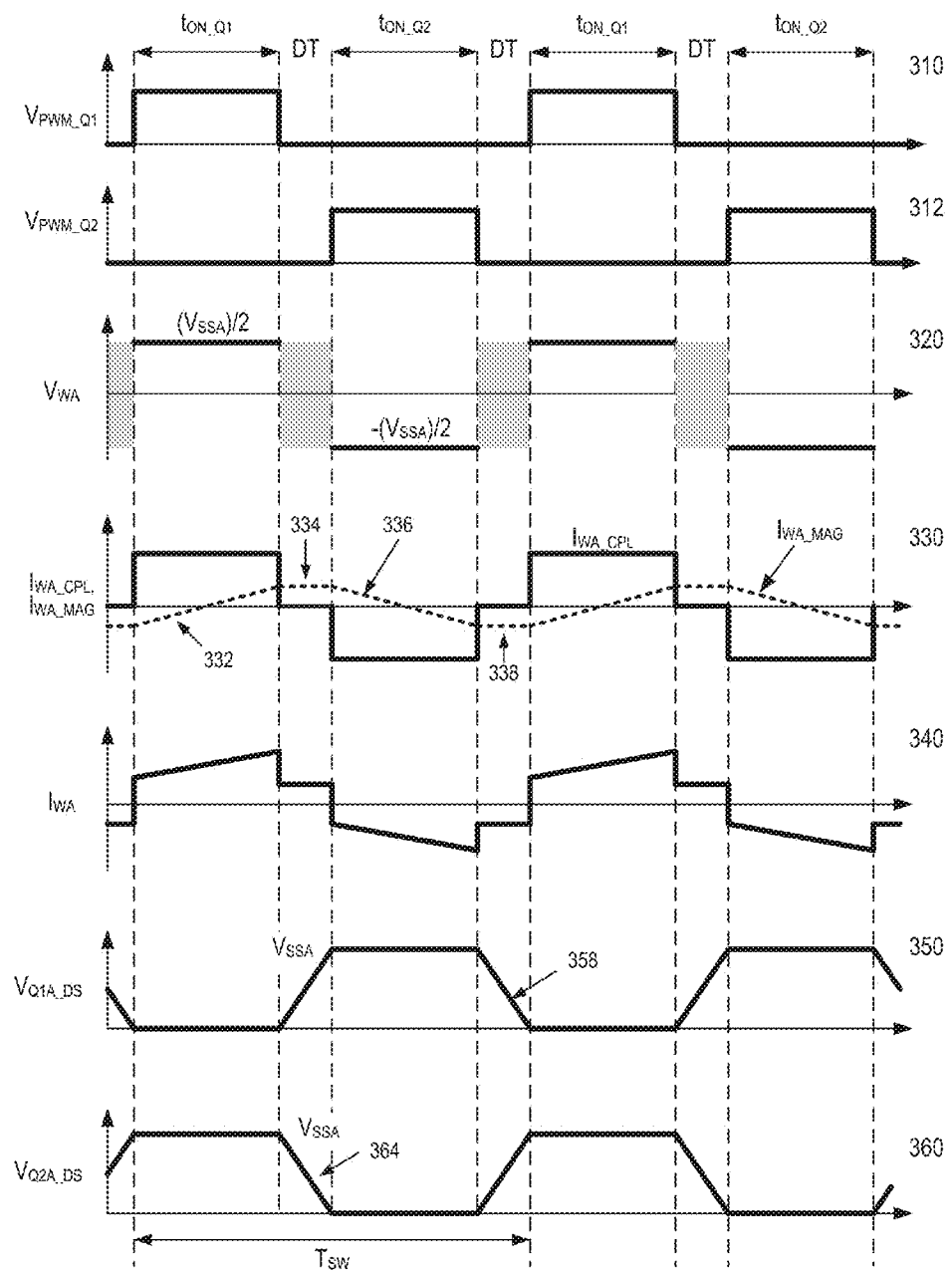
FIG. 3 illustrates voltage and current waveforms within a voltage converter such as that shown in FIG. 1.

FIG. 3 illustrates waveforms corresponding to currents and voltages during operation of the voltage converter 100, and, in the interest of reducing redundancy, focuses on currents and voltages within the first switch stage 140a. While not explicitly illustrated or described, the currents and voltages within the second switch stage 140b are similar to those of the first switch stage 140a, and often differ only in the current direction or voltage polarity.

As previously described, the controller 120 generates first and second control signals $V_{PWM\_Q1}$, $V_{PWM\_Q2}$, which control, inter alia, the switches Q1A, Q2A. Voltage waveforms 310; 312 corresponding to these signals are illustrated in FIG. 3. These signals are generated with a switching frequency having a corresponding switch period $T_{SW}$, as shown. The switch period $T_{SW}$ is partitioned into the first conducting interval; denoted $t_{ON\_Q1}$, the second conducting interval, denoted $t_{ON\_Q2}$, and two dead-time intervals, denoted DT. During the first conducting interval $t_{ON\_Q1}$, the first control signal $V_{PWM\_Q1}$ is high (active), thereby setting; via the bootstrap switch driver 131a, the first switch Q1A to conduct. At the end of the first conducting interval $t_{ON\_Q1}$, the first control signal $V_{PWM\_Q1}$ transitions to a low level, thereby turning off the first switch Q1A. Both switches Q1A and Q2A are held off for the DT interval. This is followed by the second conducting interval $t_{ON\_Q2}$, during which the second control signal $V_{PWM\_Q2}$ is high (active), such that the second switch Q2A conducts. This is followed by another DT interval, during which both switches Q1A; Q2A are again held off. Such a sequence is repeated for each switching period $T_{SW}$ while the voltage converter is operational.

As previously discussed, the capacitors C2A and C3A are sized such that the connection node V2A maintains a relatively stable voltage that equally splits the voltage $V_{SSA}$ across the first switch stage 140a, i.e., the DC voltage maintained at V2A is fairly stable around $$\left(V_{IN} - \frac{V_{SSA}}{2}\right).$$

During the first conducting interval $t_{ON\_Q1}$ the first switch Q1A conducts and acts nearly as a short circuit, such that the first switching node V1A has a voltage of approximately $V_{IN}$. (The current path 201a of FIG. 2A shows the current flow during this first conducting interval $T_{ON\_Q1}$.) This leads to a voltage $V_{WA}$ of $$\frac{V_{SSA}}{2}$$

across the first winding 192a during the first conducting interval $t_{ON\_Q1}$, as shown in the waveform 320 of voltage $V_{WA}$ in FIG. 3. Conversely, during the second conducting interval $t_{ON\_Q2}$, the second switch Q2A conducts, leading to a voltage $V_{WA}$ of $$-\left(\frac{V_{SSA}}{2}\right)$$

across the first winding 192a during this interval. (The current path 202a of FIG. 2B shows the current flow during the second conducting interval $t_{ON\_Q2}$.) This is also shown in the voltage $V_{WA}$ waveform 320 of FIG. 3.

The first coupling element 192a is illustrated as a winding of a transformer 190. In an ideal transformer, the power associated with the current through and the voltage across (e.g., $I_{WA}$ and $V_{WA}$) a transformer winding is entirely transferred, via the transformer's core, to one or more other transformer windings. In an actual transformer, the mutual inductance of the magnetically coupled windings is not perfect, meaning that not all of the energy provided to a winding is transferred to other windings. To account for these practical limitations, an actual transformer winding is often modelled as an ideal transformer winding, a magnetizing inductance $L_{MAG}$ in parallel with the ideal transformer winding, and a leakage inductance $L_{LK}$ in series with the combined ideal transformer winding and the magnetizing inductance. The current flow $I_W$ through an actual winding may be partitioned into an ideal coupled current component $I_{CPL}$ flowing through the modelled ideal transformer winding, and a magnetizing current component $I_{MAG}$ flowing through the modelled magnetizing inductance, where $I_W = I_{CPL} + I_{MAG}$.

FIG. 3 illustrates waveforms 330 corresponding to components $I_{WA\_CPL}$, $I_{WA\_MAG}$ of the current $I_{WA}$ through the first winding 192a. During the first conducting interval $T_{ON\_Q1}$, the voltage $$V_{WA} = \frac{V_{SSA}}{2}$$

applied across the first winding 192a leads to an ideal coupled current $I_{WA\_CPL}$, as shown in the waveforms 330, wherein the energy associated with this current is perfectly transferred to the second winding 192b. The positive voltage applied across the first winding 192a also leads to a magnetizing current $I_{WA\_MAG}$. The energy associated with this current $I_{WA\_MAG}$ is stored in the magnetic core 198 of the transformer, rather than being transferred to any other windings. (The transformer core also has associated energy losses, which are considered negligible for this description.) The magnetizing current $I_{WA\_MAG}$ increases 332 approximately linearly whenever a positive voltage $$\left(e.g., V_{WA} = \frac{V_{SSA}}{2}\right)$$

is applied across the first winding 192a, as shown during the first conducting interval $t_{ON\_Q1}$. This magnetizing current $I_{WA\_MAG}$ decreases 336 approximately linearly whenever a negative voltage $$\left(e.g., V_{WA} = -\frac{V_{SSA}}{2}\right)$$

is applied, as shown during the second conducting interval $t_{ON\_Q2}$.

During the dead time interval following the first conducting interval $t_{ON\_Q1}$, no voltage is directly applied across the first winding 192a that would force any coupled current flow, i.e., $I_{WA\_CPL} = 0$. However, magnetization energy stored in the transformer core 198 is returned to the first switch stage 140a via the magnetization current $I_{MAG\_WA}$, which continues 334 to flow after the voltage across the winding 192a is removed. This continued flow 334 may decrease nonlinearly, e.g., with an second order or exponential decay, such that a decreasing voltage across $V_{WA}$ is induced.

$$V_{WA} = -\frac{V_{SSA}}{2}$$

During the second conducting interval $t_{ON\_Q2}$, the negative voltage applied across the first winding 192a leads to a negative pulse for the ideal coupled current $I_{WA\_CPL}$. Again, the energy associated with this current $I_{WA\_CPL}$ is considered perfectly transferred magnetically to the second winding 192b, albeit in an opposite direction. The magnetizing current $I_{WA\_MAG}$ decreases 336 approximately linearly during this interval $t_{ON\_Q2}$, as a negative voltage $$\left(e.g., V_{WA} = -\frac{V_{SSA}}{2}\right)$$

is applied across the first winding 192a.

As in the dead time interval following the first conducting interval $t_{ON\_Q1}$, no voltage is directly applied across the first winding 192a during the dead time interval following the second conducting interval $t_{ON\_Q2}$. This means there is no coupled current flow, i.e., $I_{WA\_CPL} = 0$. However, magnetization energy stored in the transformer core 198 is released leading to continued current flow 338 due to the magnetization current $I_{MAG\_WA}$. The magnetization current $I_{WA\_MAG}$ is similar to that 334 flowing during the previous dead time, except having a different polarity.

The actual current $I_{WA}$ through the first winding 192a is the sum of the above-described coupled and magnetization currents $I_{WA\_CPL}$, $I_{WA\_MAG}$. A current waveform 340 corresponding to this sum is illustrated in FIG. 3.

During the dead time interval following the first conducting interval $t_{ON\_Q1}$, the magnetizing current $I_{WA\_MAG}$ through the first winding 192a, in conjunction with the circuit inductances and capacitances (e.g., $L_{WA\_MAG}$, $L_{WA\_LK}$, $C_{AB}$); serves to decrease the voltage at the first switching node V1A. This results in a reduced voltage across the first and second terminals of the second switch Q2A, as illustrated in the voltage waveform 360 for the drain-to-source voltage $V_{Q2A\_DS}$ for the second switch Q2A. In preferred embodiments; the dead time interval is determined such that the switch voltage $V_{Q2A\_DS}$ is reduced 364 to zero before the start of the second conducting interval $t_{ON\_Q2}$, i.e., ZVS is achieved for the second switch Q2A. Such determination may be made based upon, e.g., characterized inductances ($L_{WA\_MAG}$, $L_{WA\_LK}$) for the transformer 190, and capacitances (e.g., $C_{AB}$, C1A, C2A, C3A) of the first switching stage 140a. In non-deal embodiments, the switch voltage $V_{Q2A\_DS}$ may be reduced, but not all the way to zero. Such non-ideal embodiments still provide power-saving advantages over embodiments that do not reduce the switch voltage $V_{Q2A\_QS}$ before turning the second switch Q2A on.

A similar scenario occurs for the first switch Q1A during the dead time interval following the second conducting interval $t_{ON\_Q2}$. This is illustrated in the voltage waveform 350 for the drain-to-source voltage $V_{Q1A\_DS}$ of the first switch Q1A. Here, it can be seen that the voltage $V_{Q1A\_DS}$ is reduced 358 to zero before the first switch Q1A is turned on for another first conducting interval $t_{ON\_Q1}$, i.e., ZVS is also achieved for the first switch Q1A.

While not described in detail, the switches Q1B, Q2B of the second switch stage 140b may similarly achieve ZVS, or near ZVS, due to magnetizing current $I_{WB}$ flowing through the second winding 192b during dead times.

The above description is provided in the context of switch stages having a half-bridge topology. It should be recognized that the magnetizing current provided during dead time intervals may also lead to ZVS, or near ZVS, in other topologies, e.g., full-bridge, forward.

Step-Down and Step-Up Voltage Conversion

Figure 4B:
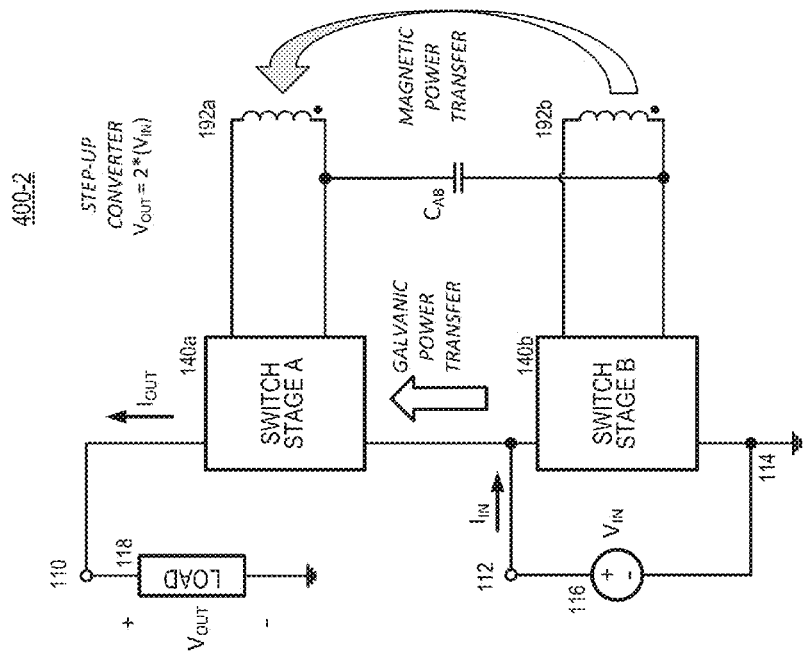
FIGS. 4A and 4B illustrate, respectively, step-down and step-up operational modes for a voltage converter, and associated input power supplies and loads that may be coupled to the voltage converter.
Figure 4A:
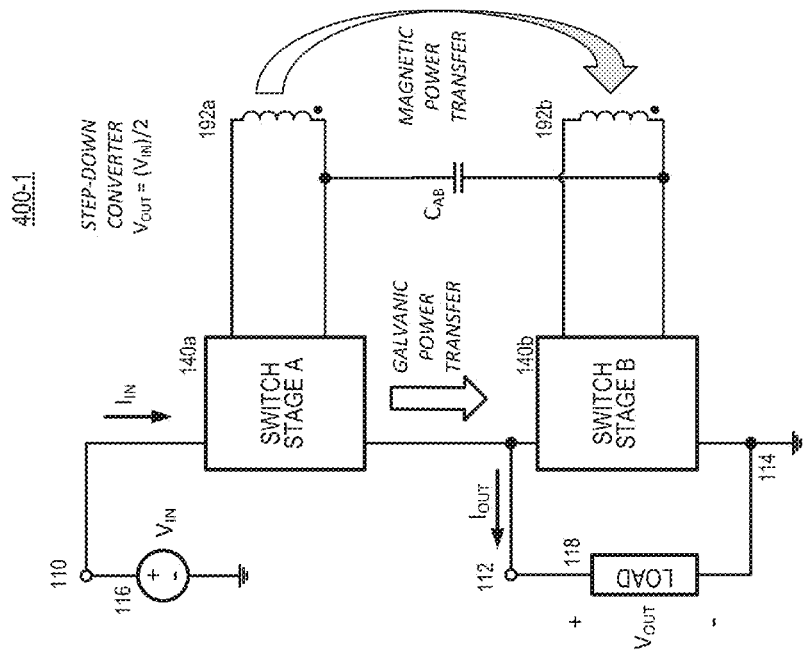

The voltage converter 100 is described above for scenarios in which it is operated to step down a voltage provided at an input. The circuitry for the voltage converter 100, and variations thereof, may also be used to step up a voltage. The switch control is substantially the same or similar for operation in a step-up mode as compared with the step-down mode, i.e., the controller 120 does not need to be changed for step-up operation of the voltage converter 100. When operated in a step-up mode, the first terminal 110 (having an associated high voltage) serves as an output from the voltage converter 100, whereas the second terminal 112 (having an associated low voltage) serves as an input. The distinctions between step-down and step-up operational modes are illustrated in FIGS. 4A and 4B. The voltage converter illustrated in these figures is similar to the voltage converter 100 of FIG. 1 but, for ease of illustration, several components of the voltage converter 100, e.g., the controller, the switch drivers, are not illustrated in FIGS. 4A and 4B.

FIG. 4A illustrates a 2:1 step-down voltage conversion system 400-1 including a voltage converter similar to that shown in FIG. 1. The first terminal 110 is coupled to an input power source 116 that provides an input voltage $V_{IN}$. The second terminal 112 supplies an output voltage $V_{OUT}$ to a load 118. Power is transferred magnetically from the first winding 192a to the second winding 192b, and is transferred galvanically from the first switch stage 140a to the second switch stage 140b. The input voltage $V_{IN}$ is stepped down by a factor of 2 to provide the output voltage $V_{OUT}$. Positive current $I_{IN}$ flows from the power source 116 to the first switch stage 140a, and positive current $I_{OUT}$ flows from the second terminal 112 to the load 118.

FIG. 4B illustrates a 1:2 step-up voltage conversion system 400-2. The circuitry of the voltage converter within the system 400-2 is the same as that within the system 400-1 illustrated in FIG. 4A, but the functions of the first and second terminals 110, 112 are swapped. The second terminal 112 is coupled to an input power source 116 that provides an input voltage $V_{IN}$. The first terminal 110 supplies an output voltage $V_{OUT}$ to a load 118. Power is transferred magnetically from the second winding 192b to the first winding 192a, and is transferred galvanically to the first switch stage 140a. The input voltage $V_{IN}$ is stepped up by a factor of 2 to provide the output voltage $V_{OUT}$. Positive current $I_{IN}$ flows from the power source 116 and the second terminal 112 to the switch stages 140a, 140b, and positive current $I_{OUT}$ flows from the first terminal 110 to the load 118. Within the switch stages 140a, 140b of the voltage conversion system 400-2, the power loops would be the same as those illustrated in FIGS. 2A and 2B, but the current directions would be reversed.

The distinction between a load, such as the load 118, and a power source, such as the source 116, need not be persistent. For example, a battery operates as a power source when it is discharging, and operates as a load when it is being charged. Similarly, the voltage converter within of the systems 400-1, 400-2 need not be exclusively used as a step-up or step-down converter; the same converter may be alternate between usage in step-up and step-down modes.

Switch-Stage Magnetic Coupling Variations

The previously-described embodiments focus on voltage converters having only two switch stages and providing step-down (step-up) ratios of 2:1 (1:2). Both switch stages are magnetically coupled to each other using windings. By cascading additional switch stages, such voltage converters may be extended to support other step-down (step-up) ratios of N:1 (1:N), where N is an integer greater than one. Embodiments of 4:1 (1:4) voltage converters are described below in conjunction with FIGS. 5A and 5B, with a focus on the magnetic coupling among the switch stages. The voltage converters illustrated in FIGS. 5A and 5B are similar to the voltage converter 100 of FIG. 1 but, for ease of illustration, several components of these voltage converters, e.g., the controller, the switch drivers, are not illustrated in FIGS. 5A and 5B. Such components are the same or similar to those components shown in FIG. 1.

FIG. 5A illustrates a voltage converter 500-1 having four switch stages 140a, 140b, 140c, 140d cascaded together. These may, e.g., be half-bridge switch stages as illustrated in FIG. 1. When operated in a step-down mode, this voltage converter 500-1 provides, at its second terminal 112, an output voltage $V_{OUT}$ that is ¼ the input voltage $V_{IN}$ supplied to the first terminal 110. Power is magnetically transferred from the first switch stage 140a to the second switch stage 140b, as shown by the arrow $P_{MAG\_AB}$, from the second switch stage 140b to the third stage 140c, as shown by the arrow $P_{MAG\_BC}$, and from the third switch stage 140c to the fourth switch stage 140d, as shown by the arrow $P_{MAG\_CD}$. These magnetic power transfers are accomplished using three transformers 590ab, 590bc, 590cd.

The first transformer 590ab comprises a first winding 592a, a second winding 592b, and a magnetic core 598ab that magnetically couples these windings. The second and third transformers 590bc, 590cd are similarly configured. The first winding 592a of the first transformer 590ab is connected to the first switch stage 140a in the same manner as described for the voltage converter 100 of FIG. 1. However, the second and third switch stages 140b, 140c are different in that they are each connected to two transformer windings, one of which inputs power and one of which outputs power. For example, the second switch stage 140b is connected to the second winding 592b of the first transformer 590ab, and receives power from the first switch stage 140a via this winding 592b. The second switch stage 140b is also connected to the first winding 592bb of the second transformer 590bc, and provides power to the third switch stage 140c via this winding 592bb. The third switch stage 140c is similarly connected to two switch windings 592c, 592cc for, respectively, inputting and outputting power magnetically. The fourth switch stage 140d is only connected to one winding 592d, as the fourth switch stage 140d does not output power magnetically.

For the illustrated step-down operation, power is magnetically transferred from the first 140a to the second 140b, from the second 140b to the third 140c, and from the third 140c to the fourth 140d switch stages. Power is also transferred galvanically (electrically) through the cascaded switch stages 140a, 140b, 140c, 140d. When operated in a step-up mode, power is magnetically and galvanically transferred in an opposite direction. For the step-up mode, the second terminal 112 serves as an input, and the first terminal 110 serves as an output that has an output voltage four times that of the input voltage.

FIG. 5B illustrates a voltage converter 500-2 that also has four cascaded switch stages 140a, 140b, 140c, 140d, but in which the magnetic power transfer $P_{MAG}$ differs from that of the voltage converter 500-1. The magnetic power transfer is accomplished using a transformer 590 that includes windings 192a, 192b, 192c, 192d and a core 598. As in the voltage converter 100 of FIG. 1, each of the switch stages is connected to one winding. The windings 192a, 192b, 192c, 192d are magnetically coupled to each other via a common magnetic core 598. For example, the windings 192a, 192b, 192c, 192d may be wrapped around a common ferrite core. The common core 598 does not limit electromagnetic power transfer to be between adjacent switch stages. For example, the magnetic power induced into the core 598 by the first winding 192a will be provided, to varying degrees, to each of the second, third, and fourth switch stages 140b, 140c, 140d, via their associated windings 192b, 192c, 192d. When operated in the illustrated step-down operational mode, the overall magnetic power transfer flows from the first switch stage 140a to the fourth switch stage 192d via the intermediate switch stages 140b, 140c. Power is also transferred galvanically through the switch stages 140a, 140b, 140c, 140d. When the voltage converter is operated in a step-up mode, the magnetic and galvanic power flow is reversed.

While the magnetic coupling among stages is shown using two representative voltage converter embodiments 500-1, 500-2, it should be recognized that other magnetic coupling linkages are possible. Linking capacitors between switch stages may also be used to supplement the magnetic coupling. To achieve the benefits of the invention, though, at least two switch stages within a cascaded arrangement of switch stages are magnetically coupled to each other such that power may be electromagnetically transferred between the magnetically coupled switch stages.

Switch-Stage Topologies

Figure 6:
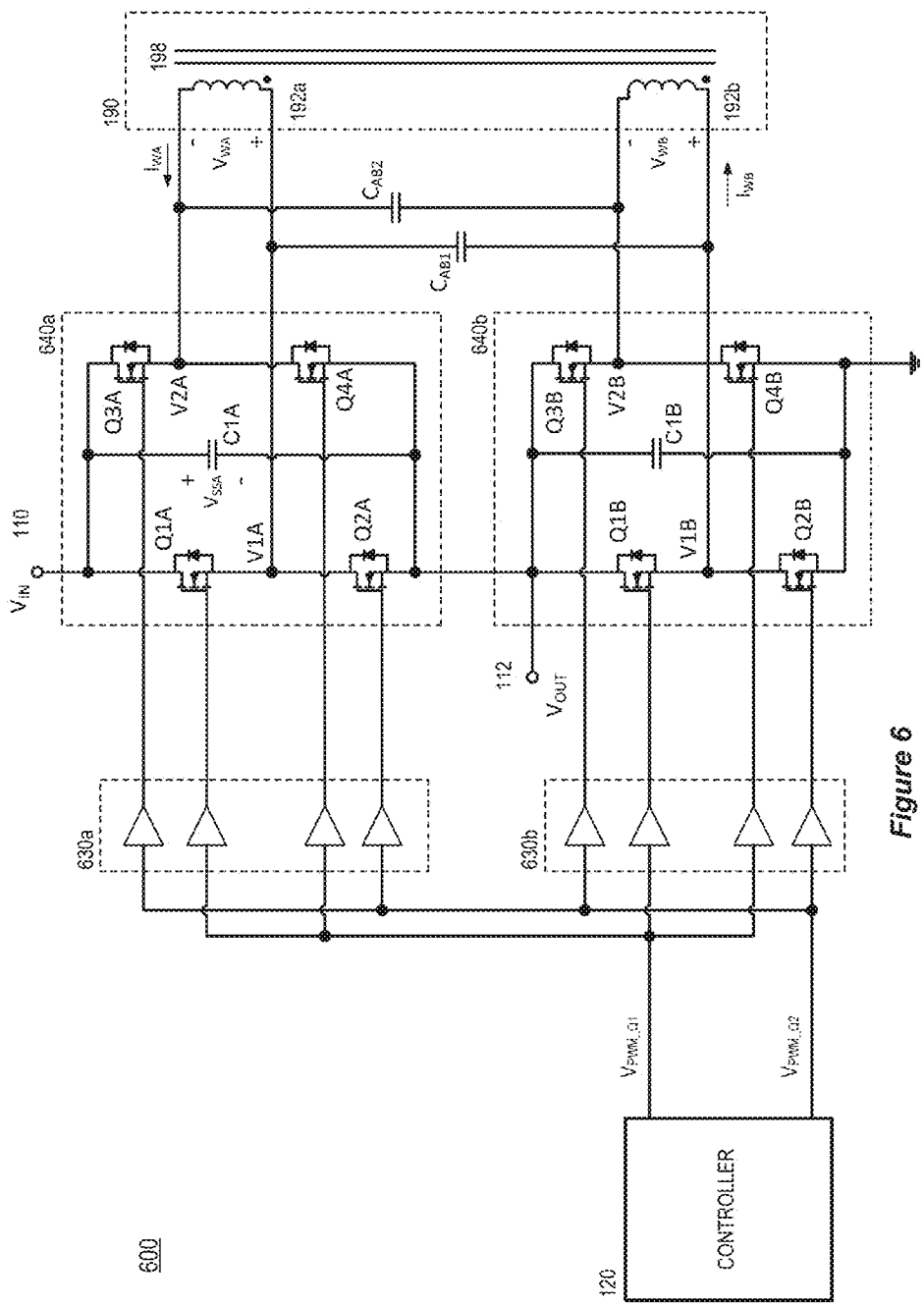
FIG. 6 illustrates a voltage converter based upon switch stages having full-bridge topologies.
Figure 7B:
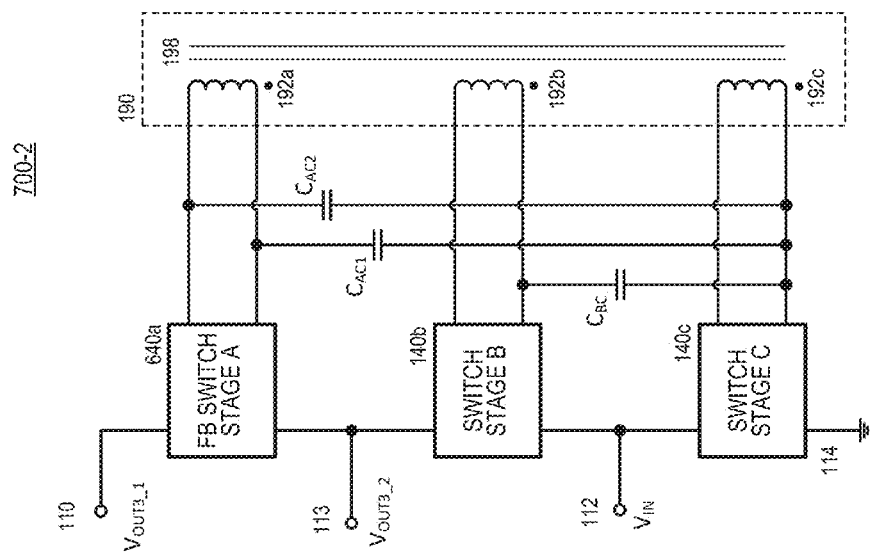
FIGS. 7A and 7B illustrate a voltage converter configured for fractional voltage conversion and operating, respectively, in step-down and step-up modes.
Figure 7A:
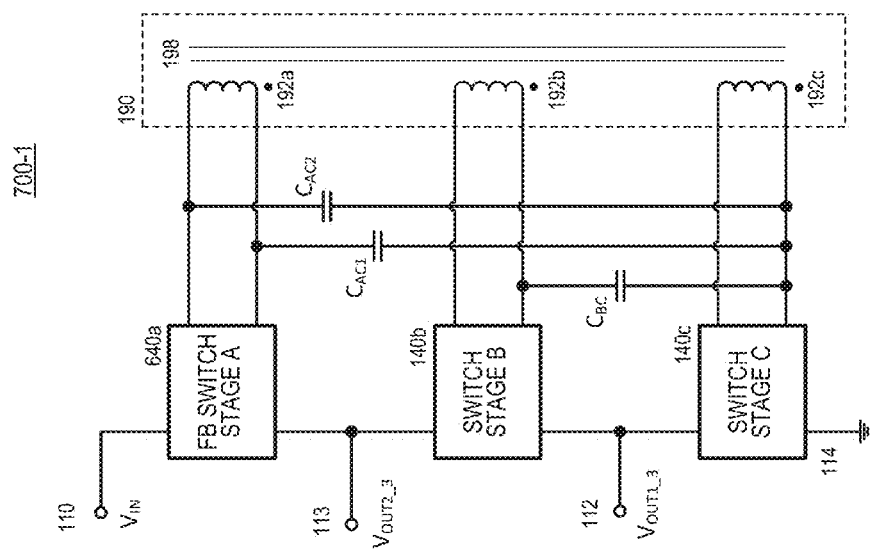

The voltage converter 100 of FIG. 1 and its variations are described above using embodiments that include switch stages configured using half-bridge topologies. The switch stages may use other topologies such as forward, flyback, LLC, or full-bridge. An embodiment using full-bridge switch stages is illustrated in FIG. 6 and described below. Because such topologies are generally well-known in the art, embodiments based upon further topologies are not described in detail. Note that the switch stages within a voltage converter according to the invention do not need to all be of the same topology, i.e., a mixture of switch stage topologies may be used within a voltage converter, as is shown in FIG. 7A.

FIG. 6 illustrates a voltage converter 600 that is similar to the voltage converter 100 of FIG. 1, but in which full-bridge switch stages 640a, 640b are used rather than half-bridge switch stages. As is generally known in the art, a full-bridge circuit allows for higher power throughput than a similarly-configured half-bridge circuit. More particularly, during a power transfer interval, the entire voltage $V_{SSA}$ across the first switch stage 640a may be provided to the first winding 192a using a full-bridge topology, rather than merely half of the switch stage voltage $$\left(\text{e.g.,} \frac{V_{SSA}}{2}\right)$$

that is provided to the first winding 192a when using a half-bridge topology.

The voltage converter 600 includes drivers 630a, 630b, for driving switches within, respectively, the first and second full-bridge switch stages 640a, 640b. The illustrated drivers 630a, 630b are active drivers providing necessary voltage level shifting. For ease of illustration, not all connections to these drivers are shown, e.g., connections for providing reference voltage levels are omitted. In an alternative driver configuration, the drivers 630a, 630b may be replaced with a mixture of direct drive circuits and bootstrap switch drivers, as shown in FIG. 1 and described previously.

Taking the first switch stage 640a as representative, the capacitors C2A, C3A of the half-bridge switch stage 140a from FIG. 1 have been replaced with third and fourth switches Q3A, Q4A, each of which has a corresponding switch driver. The third switch is controlled, via a switch driver, using the same switch control signal $V_{PWM\_Q2}$ that is used to control the second switch Q2A; whereas the fourth switch is controlled, via a switch driver, using the same switch control signal $V_{PWM\_Q1}$ that is used to control the first switch Q1A.

During a first conducting interval, the first and fourth switches Q1A, Q4A are turned on, thereby applying a first switch stage voltage $V_{SSA}$ across the first winding 192a. Power is transferred magnetically from the first winding 192a to the second winding 192b during this first interval. During a subsequent dead-time interval, all of the switches Q1A, Q4A, Q2A, Q3A are off. A demagnetizing current flows through the first winding 192a and reduces a voltage at the first switching node V1A to a level such that the voltage across the second switch Q2A is zero (or nearly zero), and raises a voltage at the second switching node V2A to a level such that the voltage across the third switch is also zero (or nearly zero). During a second conducting interval, the second and third switches Q2A, Q3A are turned on, thereby applying the first switch stage voltage $V_{SSA}$ across the first winding 192a in an opposite polarity to that provided during the first conducting interval. Power is again transferred magnetically from the first winding 192a to the second winding 192b during this second interval, but using current flows $I_{WA}$, $I_{WB}$ through the windings 192a, 194b which have an opposite direction to that of the first conduction interval. After the second conducting interval, all of the switches Q1A, Q4A, Q2A, Q3A are off for another dead-time interval. During this interval, a demagnetizing current in the first winding 192a reduces voltages across the first and fourth switches Q1A, Q4A to zero (or nearly zero), in preparation turning this switches on for another first conducting interval.

Voltage Conversion Factors

The previously-described embodiments focus on voltage converters having step-down ratios of N:1 or step-up ratios of 1:N, where N is an integer greater than one. In particular, 2:1 step-down, 4:1 step-down, 1:2 step-up, and 4:1 step-up voltage converters are illustrated and have been described in detail. However, voltage converters according to the inventive techniques are not limited to N:1 and 1:N conversion factors, as such converters may generally support step-down and step-up ratios of N:M, wherein M and N are positive integers and neither is required to be one. For example, 5:3 step-down converters, 2:3 step-up converters, etc., may use the techniques described herein. Additionally, whereas the above voltage converter descriptions only reference first and second terminals for providing external electrical contact for input voltage sources and external loads, a voltage converter using the techniques herein may have additional external terminals. Embodiments of voltage converters employing such N:M step-down and step-up ratios, and embodiments having more than two external terminals are illustrated in FIGS. 7A and 7B, and are described below. Circuitry, e.g., a controller, drivers, that is the same as that described previously is not necessarily replicated within these figures.

FIG. 7A illustrates a voltage converter 700-1 having three switch stages 640a, 140b, 140c, and that is operating in a step-down mode. In this mode, the first terminal 110 is for coupling to an input power supply (not illustrated), which provides an input voltage $V_{IN}$, and the second terminal 112 is for providing an output voltage $V_{OUT1\_3}$ to a load (not illustrated). The voltage $V_{OUT1\_3}$ provided at the second terminal 112 is stepped down by a factor of three relative to the input voltage $V_{IN}$, i.e., the voltage converter 700-1 is operating as a 3:1 down-converter. In addition to the second terminal 112, a third terminal 113 taps a voltage between the first and second switch stages 640a, 140b. This third terminal 113 may supply power to another load (not illustrated) at an output voltage $V_{OUT2\_3}$ that is stepped down by 3:2 relative to the input voltage $V_{IN}$. Considering an example scenario in which the first terminal 110 is coupled to a 9V battery, the third terminal 113 would output a voltage of 6V that could be supplied to a load, and the second terminal 112 would output a voltage of 3V that could be supplied to another load.

The first switch stage 640a is shown as having a full-bridge (FB) topology, whereas the other switch stages 140b, 140c have half-bridge (HB) topologies, i.e., the voltage converter 700-1 includes a mixture of switch stage topologies.

FIG. 7B illustrates a voltage converter 700-2 having similar or the same circuitry as the voltage converter 700-1 of FIG. 7A, but which is operating in a step-up mode. In this mode, the second terminal 112 is for coupling to an input power supply (not illustrated), which provides an input voltage $V_{IN}$. The first and third terminals 110, 113 are for connecting to loads (not illustrated) of the voltage converter 700-2, and provide, respectively, output voltages $V_{OUT3\_1}$, $V_{OUT3\_2}$ that are stepped up by 3 and 3/2 relative to the input voltage $V_{IN}$.

Method for Voltage Conversion Using Magnetic and Galvanic Coupling

Figure 8:
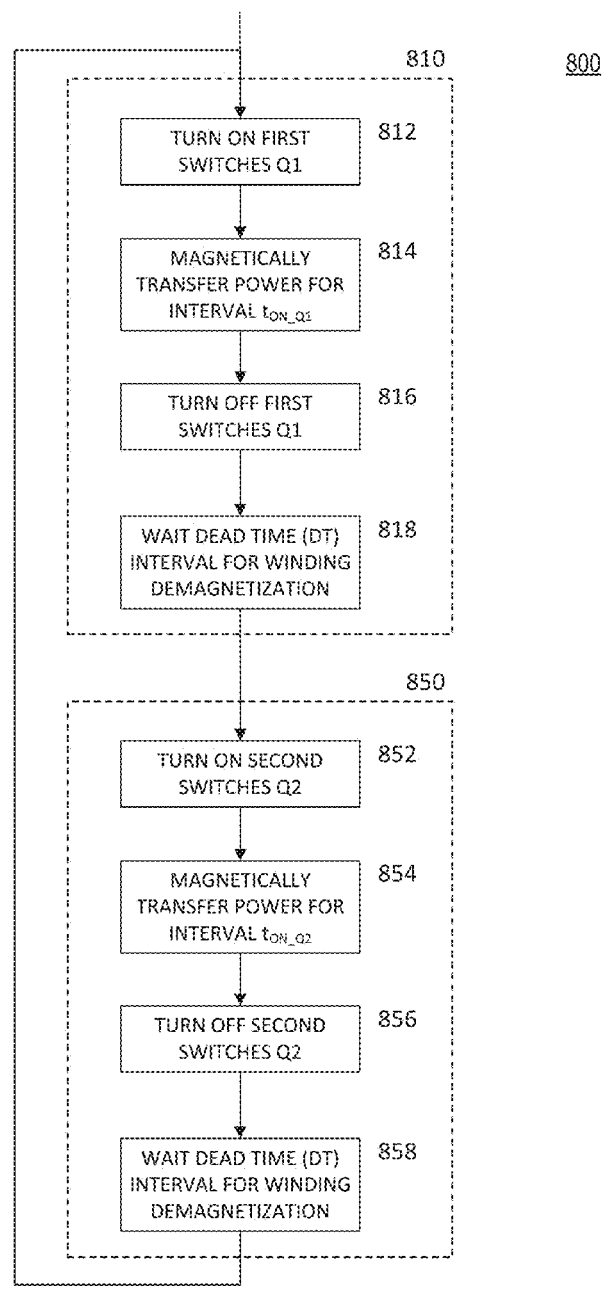
FIG. 8 illustrates a method, within a voltage converter, for magnetically transferring power between switch stages which are coupled together both magnetically and galvanically.

FIG. 8 illustrates a method 800 for converting an input voltage provided at a first terminal of a voltage converter into an output voltage provided at a second terminal. This method may be implemented within a voltage converter such as that illustrated in FIG. 1. The voltage conversion techniques of this method 800 use electromagnetic coupling to transfer power between switch stages within a voltage converter.

The method 800 begins with a step of turning on 812 first switches Q1 within each of a plurality of switch stages of a voltage converter. With the first switches Q1 conducting, power is magnetically transferred 814 among the switch stages for a first conducting time interval $t_{ON\_Q1}$. The first switches Q1 are then turned off 816, such that none of the switches are conducting, thereby stopping the inter-switch-stage magnetic power transfer. The switches are held 818 in this off state for a dead-time (DT) interval, during which windings used for the magnetic power transfer may demagnetize by inducing current into the switch stages. This demagnetization need not be complete. In preferred embodiments, for a properly-determined DT interval, the demagnetization current and voltage may reduce a voltage across second switches Q2 within each of the switch stages to zero (or nearly zero) during the dead time. The steps 812, 814, 816, and 818 related to control of the first switches Q1 are grouped within a sequence 810 of the method 800.

The method 800 proceeds with a sequence 850 of steps directed to control of second switches Q2. These steps are similar to those described within the sequence 810. The second switches Q2 of the switch stages are turned on 852, such that power is magnetically transferred 854 among the switch stages for a second conducting time interval $t_{ON\_Q2}$. The second switches Q2 are then turned off 856, so that none of the switches are conducting. The switches are held 858 in this off state for a dead-time (DT) interval, during which windings used for the magnetic power transfer may demagnetize. The demagnetization current and voltage may reduce a voltage across first switches Q1 within each of the switch stages to zero (or nearly zero) during the dead time, in preparation for repeating the sequence 810. The sequences 810, 850 are repeated indefinitely while the voltage converter is operating.

The above method description may be extrapolated to apply to voltage converters that are not based upon half-bridge topologies. For example, a voltage converter having full-bridge switch stages, as illustrated in FIG. 6, will include first, second, third, and fourth switches. The fourth switch is controlled using the same timing used for the first switch, and the third switch is controlled using the same timing as the second switch. For topologies relying upon a single switch within a switch stage, e.g., forward, LLC, the steps 850 related to second switches Q2 may be omitted.

As used herein, the terms "having," "containing," "including," "comprising," and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A voltage converter, comprising:
a first switch stage and a second switch stage which are electrically coupled together in a cascade arrangement, and connected in series between an input or an output and a ground, wherein each of the first and the second switch stages comprises a first switch having a first terminal, a second terminal, and a control terminal;
a first magnetic coupling element comprising first and second magnetic coupling terminals which are electrically coupled to the first switch stage and which magnetically couples the first switch stage to the second switch stage via a second magnetic coupling element, the second magnetic coupling element comprising third and fourth magnetic coupling terminals which are electrically coupled to the second switch stage; and
a controller operable to control switching of the first switch of each of the first and the second switch stages by providing control signals to the respective control terminals of the first switches such that power is transferred magnetically between the first and the second switch stages via the first and the second magnetic coupling elements,
wherein the input is for coupling to an input power supply, and is electrically coupled to at least one of the first and the second switch stages,
wherein the output is for providing power to a load, and is electrically coupled to at least one of the first and the second switch stages, and
wherein the input and the output are electrically connected through at least one of the first and the second switch stages.

2. The voltage converter of claim 1,
wherein the first switch stage further comprises a second switch having a first terminal, a second terminal, and a control terminal, and wherein the first terminal of the second switch of the first switch stage is coupled to the second terminal of the first switch of the first switch stage at a switching node of the first switch stage,
wherein the second switch stage further comprises a second switch having a first terminal, a second terminal, and a control terminal, and wherein the first terminal of the second switch of the second switch stage is coupled to the second terminal of the first switch of the second switch stage at a switching node of the second switch stage,
wherein, for the first switch stage, the first terminal of the first switch and the second terminal of the second switch form terminals of the first switch stage, and
wherein, for the second switch stage, the first terminal of the first switch and the second terminal of the second switch form terminals of the second switch stage.

3. The voltage converter of claim 2, further comprising:
a first link capacitor that couples the switching node of the first switch stage to the switching node of the second switch stage or to a switching node of an additional switch stage.

4. The voltage converter of claim 2,
wherein the controller is further operable to generate a first pulse-width-modulated (PWM) signal that is coupled to the respective control terminals of the first switches of the first and the second switch stages,
wherein the controller is further operable to generate a second PWM signal coupled to the respective control terminals of the second switches of the first and the second switch stages, and
wherein the first and the second PWM signals alternately turn on the first and the second switches of the first and the second switch stages, such that the first switches of the first and the second switch stages are turned on for first common time intervals, and the second switches of the first and the second switch stages are turned on for second common time intervals.

5. The voltage converter of claim 2, wherein at least one of the first and the second switch stages is configured in a half-bridge topology.

6. The voltage converter of claim 1,
wherein the first switch stage is configured in a full-bridge topology and further includes:
a second switch having a first terminal coupled to the second terminal of the first switch of the first switch stage at a first bridge switching node, wherein the first terminal of the first switch of the first switch stage and the second terminal of the second switch form, respectively, a first switch-stage terminal and a second switch-stage terminal of the first switch stage; and
a third switch and a fourth switch connected at a second bridge switching node, the third switch having a first terminal coupled to the first switch-stage terminal and the fourth switch having a second terminal coupled to the second switch-stage terminal,
wherein the controller is operable to switch the first, second, third and fourth switches of the first switch stage, such that power is transferred magnetically between the first switch stage and the second switch stage or between the first switch stage and at least one additional switch stage of the voltage converter via the first magnetic coupling element.

7. The voltage converter of claim 1, wherein the first and the second switch stages are configured in different respective topologies.

8. The voltage converter of claim 1, wherein the first magnetic coupling element is selected based on a switching frequency of the voltage converter, a combined switching capacitance of the voltage converter and a predetermined transition time of the voltage converter, so as to produce at least one of zero voltage switching (ZVS), near ZVS, zero current switching (ZCS), or near ZCS, for one or more switches within the first switch stage for a predetermined range of voltage across the first switch stage.

9. The voltage converter of claim 1,
wherein the first switch stage includes a capacitor connected in series with the first magnetic coupling element, and
wherein the serially-connected capacitor and first magnetic coupling element are coupled across the first and second terminals of the first switch of the first switch stage.

10. The voltage converter of claim 1, further comprising:
one or more additional switch stages, wherein each additional switch stage has an associated additional magnetic coupling element; and
a transformer that includes the first magnetic coupling element, the second magnetic coupling element, a core, and the additional magnetic coupling elements associated with the additional switch stages, wherein the core magnetically couples the first magnetic coupling element, the second magnetic coupling element, and the additional magnetic coupling elements.

11. The voltage converter of claim 1, further comprising:
one or more additional switch stages, wherein each additional switch stage has an associated additional magnetic coupling element; and
a transformer that includes the first magnetic coupling element, the second magnetic coupling element, a core, and the additional magnetic coupling elements associated with the additional switch stages,
wherein the first magnetic coupling element is coupled to at least one but not all of the second magnetic coupling element and the additional magnetic coupling elements.

12. The voltage converter of claim 1, wherein the voltage converter is configured to convert an input voltage into an output voltage, wherein the output voltage is the input voltage multiplied by M and divided by N, where M and N are each positive integers.

13. The voltage converter of claim 12, wherein either:
M is equal to 1 and N is greater than or equal to 2, resulting in a step-down conversion ratio of N to 1 for the voltage converter, or
N is equal to 1 and M is greater than or equal to 2, resulting in a step-up conversion ratio of 1 to M for the voltage converter.

14. The voltage converter of claim 1, further comprising third and fourth switch stages, and wherein the voltage converter is a four-to-one step down converter.

15. The voltage converter of claim 1,
comprising a first terminal corresponding to a high voltage, and a second terminal corresponding to a low voltage,
wherein the voltage converter is adapted to operate in a step-down mode for a first operational interval, during which the first terminal is the input and the second terminal is the output, and
wherein the voltage converter is further adapted to operate in a step-up mode for a second operational interval, during which the second terminal is the input, and the first terminal is the output.

16. The voltage converter of claim 1, further comprising:
a third switch stage electrically coupled to the first switch stage and the second switch stage, and interposed between the first and the second switch stages.

17. The voltage converter of claim 1, further comprising:
a third switch stage electrically coupled to the input and to the first switch stage, and providing electrical connection between the input and the first switch stage.

18. An electrical system, comprising:
a voltage converter that comprises:
a first switch stage and a second switch stage which are electrically coupled together in a cascade arrangement, and connected in series between an input or an output and a ground, wherein each of the first and the second switch stages comprises a first switch having a first terminal, a second terminal, and a control terminal;
a first magnetic coupling element comprising first and second magnetic coupling terminals which are electrically coupled to the first switch stage and which magnetically couples the first switch stage to the second switch stage via a second magnetic coupling element, the second magnetic coupling element comprising third and fourth magnetic coupling terminals which are electrically coupled to the second switch stage; and
a controller operable to control switching of the first switch of each of the first and the second switch stages by providing control signals to the respective control terminals of the first switches such that power is transferred magnetically between the first and the second switch stages via the first and the second magnetic coupling elements,
wherein the input is for coupling to an input power supply, and is electrically coupled to at least one of the first and the second switch stages,
wherein the output is for providing power, and is electrically coupled to at least one of the first and the second switch stages, and
wherein the input and the output are electrically connected through at least one of the first and the second switch stages, and
a load which is electrically coupled to the output and which is powered by the voltage converter.

19. A method for converting voltage levels by magnetically transferring power among switch stages within a voltage converter, the voltage converter comprising a first and a second switch stage that are electrically coupled together in a cascade arrangement, and connected in series between an input or an output and a ground, a first magnetic coupling element comprising first and second magnetic coupling terminals which are electrically coupled to the first switch stage and which magnetically couples the first switch stage to the second switch stage via a second magnetic coupling element, the second magnetic coupling element comprising third and fourth magnetic coupling terminals which are electrically coupled to the second switch stage, and an input and an output that are electrically connected through at least one of the first and the second switch stages, the method comprising:
turning on a first switch within each of the first and the second switch stages for a first conducting interval, during which power is magnetically transferred, via the first and the second magnetic coupling elements, between the first and the second switch stages; and
turning off the first switches of the first and the second switch stages for a dead-time interval, during which the first and the second magnetic coupling elements demagnetize.

20. The method of claim 19, wherein each of the first and the second switch stages comprises the first switch and a second switch, the method further comprising:
turning on the second switch within each of the first and the second switch stages for a second conducting interval, during which power is magnetically transferred, via the first and the second magnetic coupling elements, between the first and the second switch stages; and
turning off the second switches for another dead-time interval, during which the first and the second magnetic coupling elements demagnetize.

21. The method of claim 19, wherein the first magnetic coupling element is a winding of a transformer and is characterized as having a first magnetizing inductance, and wherein the dead-time interval is based upon the first magnetizing inductance, such that the turning on of the first switch of each of the first and the second switch stages occurs when a voltage across each of the first switches is zero or nearly zero.

* * * * *